(12) United States Patent
Groth

(10) Patent No.: US 6,824,877 B1
(45) Date of Patent: Nov. 30, 2004

(54) CLAY COMPOSITIONS AND OBJECTS INCLUDING CLAY COMPOSITIONS

(76) Inventor: John Howard Groth, 3370 NW. Ashland Dr., Beaverton, OR (US) 97006

( * ) Notice: Subject to any disclaimer, the term of this patent is extended or adjusted under 35 U.S.C. 154(b) by 107 days.

(21) Appl. No.: 10/231,534

(22) Filed: Aug. 29, 2002

Related U.S. Application Data

(60) Provisional application No. 60/316,859, filed on Aug. 31, 2001.

(51) Int. Cl.[7] .............................. B32B 3/10; B32B 17/06; C04B 33/00
(52) U.S. Cl. ...................... 428/432; 428/427; 428/697; 428/45; 428/46; 501/5; 501/141; 501/143; 501/144
(58) Field of Search ................................ 501/5, 8, 55, 65, 501/66, 68–70, 141, 143, 144; 428/426, 427, 428, 689, 697, 702, 44, 46, 49

(56) References Cited

U.S. PATENT DOCUMENTS

| | | | |
|---|---|---|---|
| 3,715,196 A | | 2/1973 | Montierth |
| 4,248,925 A | | 2/1981 | Ambrogi |
| 4,391,914 A | | 7/1983 | Beall |
| 4,758,538 A | * | 7/1988 | Satoh et al. .................. 501/84 |
| 5,229,196 A | | 7/1993 | Seibold et al. |
| 5,262,363 A | * | 11/1993 | Yoshida et al. ............... 501/17 |
| 5,382,309 A | | 1/1995 | Seibold et al. |
| 5,962,354 A | * | 10/1999 | Fyles et al. ................... 501/36 |
| 6,220,055 B1 | | 4/2001 | Francel et al. |
| 6,413,618 B1 | * | 7/2002 | Parker et al. ............... 428/195 |
| 6,446,404 B1 | * | 9/2002 | Bassin ......................... 428/49 |

* cited by examiner

Primary Examiner—Deborah Jones
Assistant Examiner—G. A. Blackwell-Rudasill
(74) Attorney, Agent, or Firm—John Smith-Hill; Smith-Hill and Bedell

(57) ABSTRACT

A clay composition comprises, in parts by weight on oxide basis, 10–15% $Al_2O_3$, 50–85% $SiO_2$, 0–12.5% $B_2O_3$ and 10–20% metal oxides of the form RO or $R_2O$.

10 Claims, 4 Drawing Sheets

FIG.1 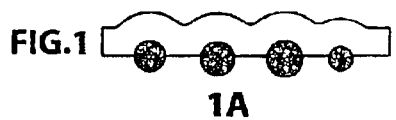 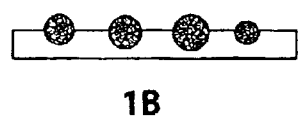 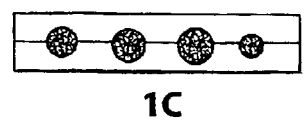
1A  1B  1C
FIG.2 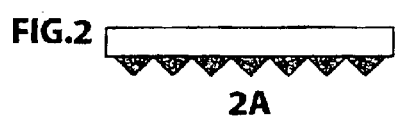 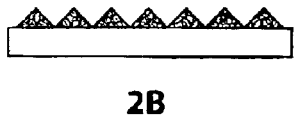 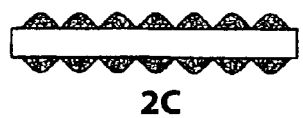
2A  2B  2C
FIG.3 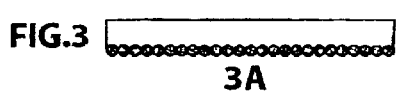 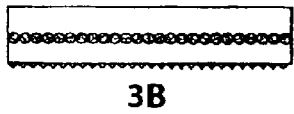 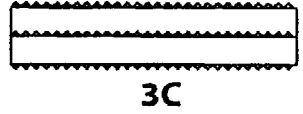
3A  3B  3C
FIG.4  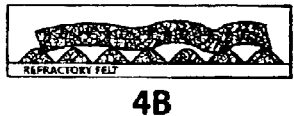 
4A  4B  4C
FIG.5 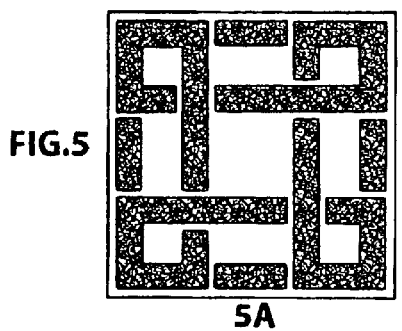 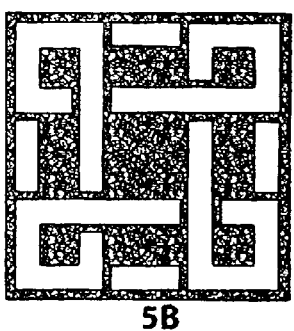 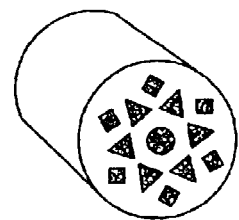
5A  5B  FIG.6
☐ GLASS   ▨ INVENTIVE PRODUCT

FIG. 7    7A    7B    7C
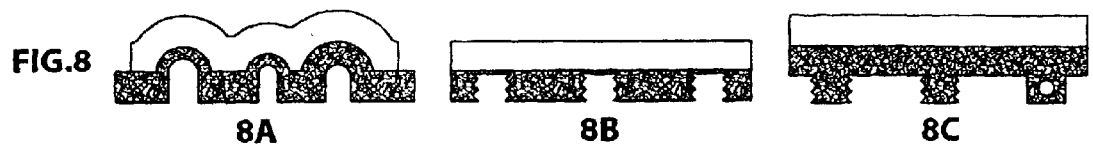
FIG. 8    8A    8B    8C
FIG. 9    9A    9B    9C
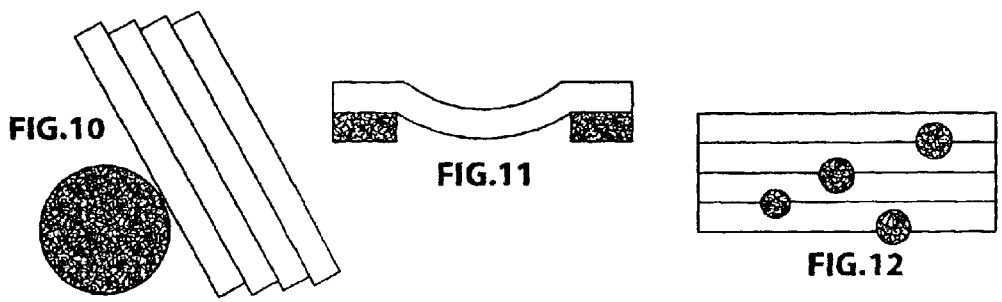
FIG. 10    FIG. 11    FIG. 12
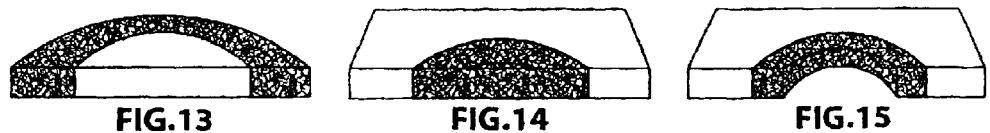
FIG. 13    FIG. 14    FIG. 15
 GLASS     INVENTIVE PRODUCT     FRIT / ENAMEL 16A 16B 17A 17B 17C

 GLASS  INVENTIVE PRODUCT

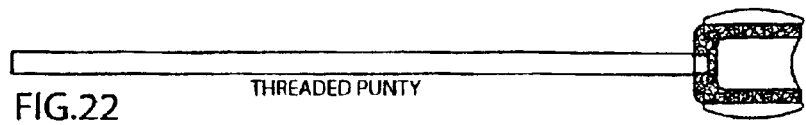
FIG.22 THREADED PUNTY
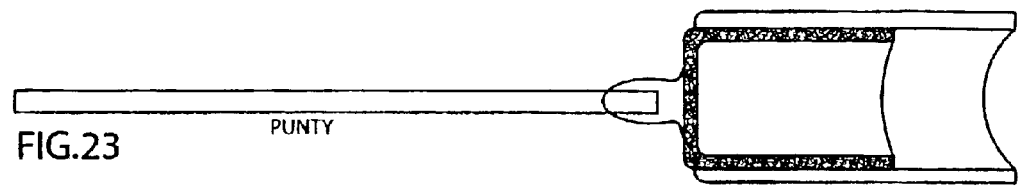
FIG.23 PUNTY
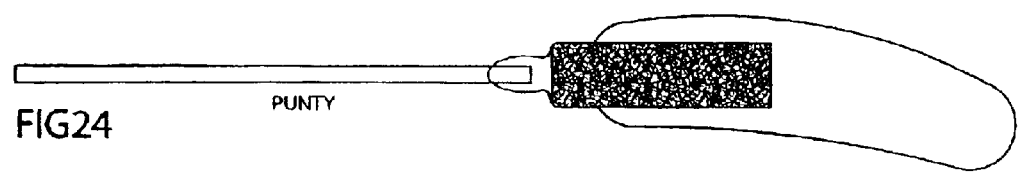
FIG24 PUNTY
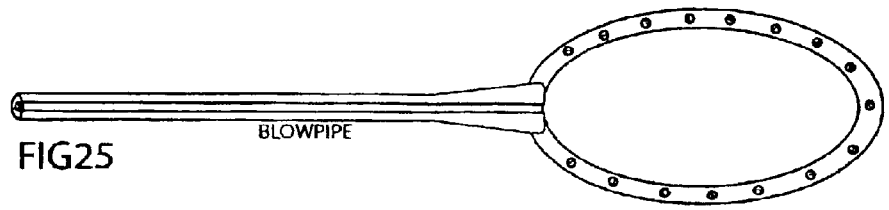
FIG25 BLOWPIPE
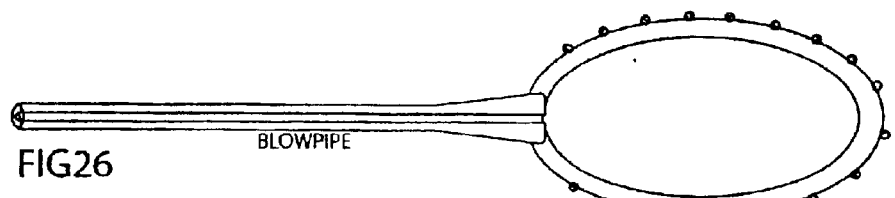
FIG26 BLOWPIPE
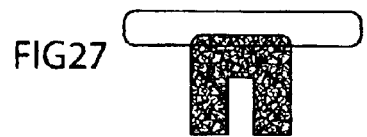
FIG27
☐ GLASS    ▨ INVENTIVE PRODUCT

CLAY COMPOSITIONS AND OBJECTS INCLUDING CLAY COMPOSITIONS

This application claims the benefit of Provisional application Ser. No. 60/316,859, filed Aug. 31, 2001.

BACKGROUND OF THE INVENTION

This invention relates to clay compositions and objects including clay compositions.

Clay is an earthy substance that is composed mainly of fine particles of hydrous aluminum silicates and other minerals and is plastic when moist but becomes hard when heated to maturity. A clay object is heated to maturity by heating it for a sufficient time and to a sufficient temperature that the clay object undergoes a ceramic change and, after cooling, the clay object is hard and vitreous. Commonly, a clay object is bisque fired before being fired to maturity. In bisque firing, water and organic materials present in the clay are driven off. Bisque firing results in an object that is hard and retains its structural form when handled but is not vitreous.

Maturity is not characterized by a single temperature value but can be achieved by heating to a temperature within a range of values. For example, a clay for which the nominal temperature of maturity is 1500° F. might be brought to maturity by heating for a suitable time to any temperature in the range from 1400° F. to 1600° F.

In this specification, the term "firing" and derivatives is used to refer to heating to maturity unless the context clearly indicates otherwise.

The term "ceramic" is widely used to refer to clay that has been fired, but in this specification the term "clay" may be used to refer both to the fired material and the unfired material. "Ware" is a generic term that covers both green (unfired) clay and ceramic.

Fired clay is widely used in construction of artistic objects. The artistic qualities of fired clay include solidity and sculptability. Also, fired clay provides a surface for receiving glazes. A fired clay object is generally made by shaping or molding green clay and then firing the clay object in a kiln and allowing the object to cool.

The composition of a clay is frequently defined on the oxide basis, which specifies the relative proportions by weight of the oxides of the elementary ingredients. A clay body is a blend of two or more naturally occurring clays. A clay supplier may blend two or more clays from respective mines to create a proprietary clay body containing desired proportions of different respective mineral ingredients. Commercially available ceramic software can be used to design a clay body to achieve a desired oxide composition. Such software enables a ceramist or a clay supplier to select specific mined clays and the proportions of each that must be blended to provide a desired oxide composition.

Glass is widely used in construction of artistic objects. An artist may purchase glass from manufacturers in a standard form, such as chunks, sheets, stringers and frit, and construct an artistic object by heating pieces of glass in a kiln so that the pieces melt and fuse together. Typically, glass fuses at a temperature of about 1325–1450° F. The artist may also work or manipulate the molten glass. When the molten glass has been brought to the desired form, the artist allows the glass to cool so that the form is fixed. Particularly in construction of artistic objects, it may be desirable to join different pieces of glass together, e.g. pieces of different color, to achieve a particular artistic effect.

If two glass pieces are fused together to form a composite structure, i.e. a structure having two or more distinct components, and the composite structure is allowed to cool to room temperature, there is a possibility that stresses created during the cooling process will lead to fracture of the composite structure. Accordingly, cooling must also take place in a controlled fashion to prevent or limit establishment of stresses in the glass due to improper annealing.

Two glasses are said to be compatible if they can be fused together and after proper cooling of the composite structure to room temperature there are no residual stresses that will lead to fracturing of the composite structure. Compatibility of two glasses is a function of both the viscosity (resistance to flow) of the glasses and the thermal expansion of the glasses (change in size as temperature changes). Thermal expansion affects compatibility below the strain point and viscosity affects compatibility from the strain point to the annealing point. Two glasses can be compatible if the stress caused by mismatch in viscosity is cancelled out by the stress due to mismatch in thermal expansion. For example, if the viscosity difference between the two glasses results in a tensile force and the thermal expansion difference results in compressive force of equal magnitude, the two forces cancel each other out and the glasses are compatible.

Thermal expansion of a material is characterized by the coefficient of thermal expansion (COE) of the material. The COE is the proportional change in linear dimension per degree Celsius change in temperature. For art glasses (that is, glasses that are manufactured and sold for fusing), the COE is typically in the range from about $80 \times 10^{-7}$ to $100 \times 10^{-7}$ per degree Celsius. It is common to ignore the $10^{-7}$ factor in the COE and refer to a value of $80 \times 10^{-7}$ per degree C simply as a COE of 80.

The artistic qualities of glasses are different from the artistic qualities of fired clay. Glasses have the qualities of transparency and clarity of color and may have fluid lines, as compared to the solidity and sculptability of clay. These differences in artistic qualities are such that many artists wish to construct artistic objects in which clay and glass are fused together. However, hitherto it has not been possible to achieve this goal due to incompatibility of clay with glass.

Glazes that are applied to a clay object include glasses, but glazes are applied only in thin layers to the surface of the clay object and it is relatively easy to ensure that the stresses that are generated in the thin layers on cooling will not result in damage to the glaze or the clay object.

A number of glass manufacturers make a range of compatible glasses, but at present glasses that are compatible with clays used in making artistic ceramic objects are not commercially available.

A number of clay composite materials have been developed for use in scientific instruments and the electronics industry. These materials have been developed so that they have low COE values and therefore they are not compatible with commercially available glasses used for making artistic works.

SUMMARY OF THE INVENTION

In accordance with the present invention there is provided a clay composition comprising, in parts by weight on oxide basis:

| | |
|---|---|
| $Al_2O_3$ | 10–15% |
| $SiO_2$ | 50–85% |
| $B_2O_3$ | 0–12.5% | and 10–20% metal oxides of the form RO or $R_2O$.

In accordance with the present invention there is further provided a composite structure comprising a clay component and a glass component fused together, the clay component comprising, in parts by weight on oxide basis:

| | |
|---|---|
| $Al_2O_3$ | 10–15% |
| $SiO_2$ | 50–85% |
| $B_2O_3$ | 0–12.5% | and 10–20% metal oxides of the form RO or $R_2O$.

In accordance with the present invention there is also provided a ceramic object made by firing a clay composition comprising, in parts by weight on oxide basis:

| | |
|---|---|
| $Al_2O_3$ | 10–15% |
| $SiO_2$ | 50–85% |
| $B_2O_3$ | 0–12.5% | and 10–20% metal oxides of the form RO or $R_2O$.

In accordance with the present invention there is moreover provided a method of manufacturing a glass-ceramic composite structure, comprising providing a clay object and a glass object, the clay object comprising, in parts by weight on oxide basis:

| | |
|---|---|
| $Al_2O_3$ | 10–15% |
| $SiO_2$ | 50–85% |
| $B_2O_3$ | 0–12.5% | and 10–20% metal oxides of the form RO or $R_2O$, and firing the clay object in contact with the glass object.

In accordance with the present invention there is in addition provided a method of manufacturing a composite structure comprising a clay component and a glass component, the method comprising providing a clay object and a glass object, the clay object comprising in parts by weight on oxide basis:

| | |
|---|---|
| $Al_2O_3$ | 10–15% |
| $SiO_2$ | 50–85% |
| $B_2O_3$ | 0–12.5% | and 10–20% metal oxides of the form RO or $R_2O$, firing the clay object to create a ceramic object, allowing the ceramic object to cool to a temperature below a fusing temperature of the glass object, placing the ceramic object and the glass object in contact, and heating the glass object and the ceramic object to the fusing temperature.

BRIEF DESCRIPTION OF THE DRAWINGS

For a better understanding of the invention, and to show how the same may be carried into effect, reference will now be made, by way of example, to the accompanying drawings, in which FIGS. 1A, 1B and 1C illustrate different forms of composite structures each including clay objects embodying the present invention and one or more glass objects, FIGS. 2A, 2B and 2C illustrate respective composite structures each including clay objects embodying the present invention and a glass object, FIGS. 3A, 3B and 3C illustrate respective composite structures each including clay objects embodying the present invention and one or more glass objects, FIGS. 4A, 4B and 4C illustrate techniques for forming composite structures from clay objects embodying the present invention and glass objects, FIGS. 5A and 5B illustrate respective composite structures each comprising clay objects embodying the present invention and one or more glass objects, FIG. 6 illustrates a sectional view of a murrini composed either of clay objects embodying the present invention encased in glass or glass objects encased in a clay embodying the present invention, FIGS. 7A, 7B and 7C illustrate respective composite structures each including a clay object embodying the present invention and a glass object, FIGS. 8A, 8B and 8C illustrate respective composite structures each including a clay object embodying the present invention and a glass object, FIGS. 9A, 9B and 9C illustrate respective composite structures each including a clay object embodying the present invention and a frit or enamel, FIG. 10 is a sectional view illustrating glass objects leaning against a clay object embodying the present invention for fusing, FIG. 11 is a sectional view illustrating a clay object embodying the present invention and a layer of compatible glass which is slumped in the firing process, FIG. 12 is a cross-sectional view of a composite structure comprising clay objects embodying the present invention and multiple sheets of glass, FIG. 13 is a sectional perspective view of a clay object embodying the present invention in the form of a dam fused with and containing glass, FIG. 14 is a sectional perspective view of a clay object embodying the present invention shaped as an interior dam fused with and holding back glass, FIG. 15 is a sectional perspective view of a clay object embodying the present invention in the form of an interior dam or ring providing a void or hole through glass that surrounds the dam or ring, FIG. 16A is a sectional view of a composite structure comprising a clay object embodying the present invention provided with fixturing elements and fused to a glass object, FIG. 16B is a sectional view of a similar composite structure, FIG. 22 is a sectional view of a composite structure comprising a clay object embodying the present invention provided with fixturing elements for attaching to glass tools to assist in gathering and fusing of hot glass, FIG. 23 is a sectional view of a composite structure comprising a clay object embodying the present invention held on the end of a punty, for hotworking, and wrapped with and fused to glass, FIG. 24 is a sectional view of a composite structure comprising a clay object embodying the present invention held on the end of a punty, for hotworking, and wrapped with and fused to a gather of glass, FIGS. 25 and 26 are sectional views of respective composite structures each comprising a clay object embodying the present invention in the form of a bubble held on the end of a blowpipe, for hotworking, and blowing, and FIG. 27 is a sectional view of a composite structure comprising a clay object embodying the present invention and fused to glass to provide a knob or drawer pull.

Figure 17:
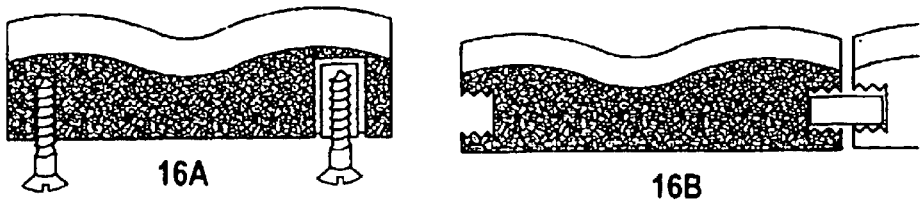
FIGS. 17A, 17B and 17C illustrate respective composite structures each comprising clay objects embodying the present invention and a glass object.
Figure 17:
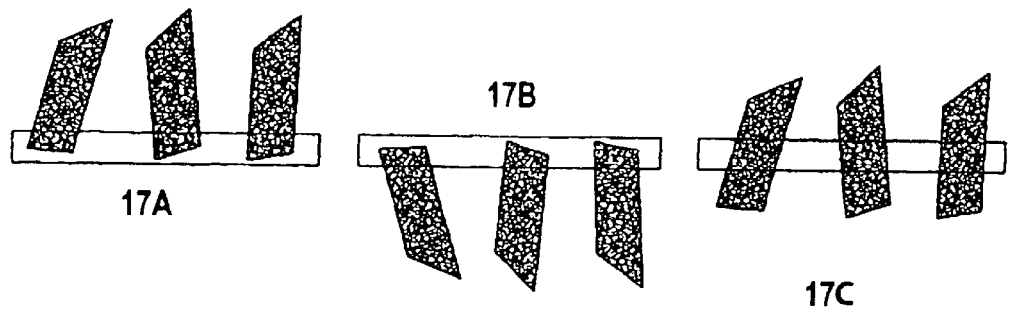
Figure 18:
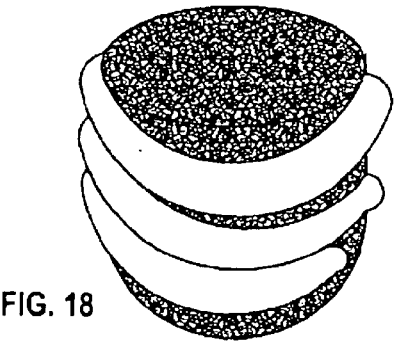
FIG. 18 illustrates a composite structure comprising a clay object embodying the present invention wrapped with glass.
Figure 19:
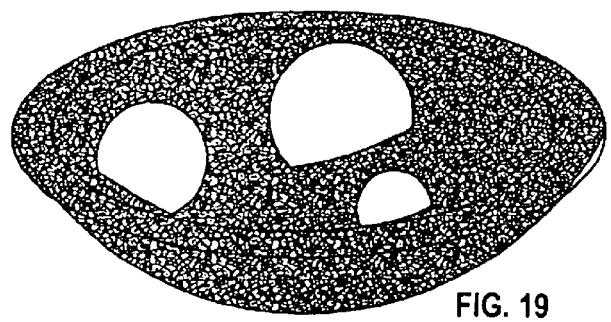
FIG. 19 is a perspective view of a clay object embodying the present invention and objects made of glass impressed into the clay object.
Figure 20:
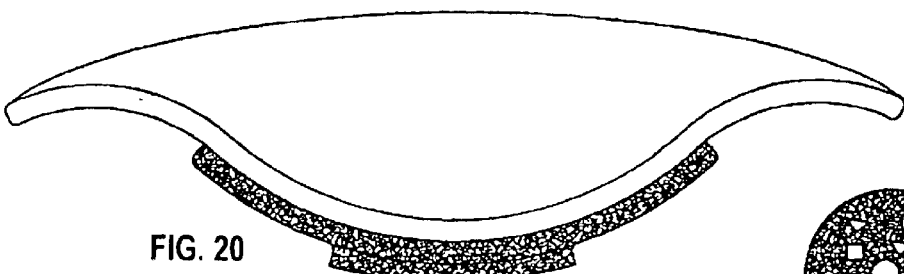
FIG. 20 illustrates a composite structure comprising a clay object embodying the present invention fused with glass, or gatherfused and hot worked.
Figure 21:
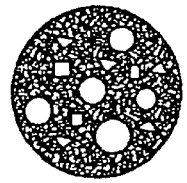
FIG. 21 is a sectional view of a composite structure comprising a clay object embodying the present invention with inclusions of glass.

In the several Figures of the drawings, wide hatching denotes clay and narrow hatching denotes frit or enamel. In Figures that include hatching that denotes clay, absence of hatching denotes glass.

DETAILED DESCRIPTION

In the following description and in the claims, all proportions are expressed in parts by weight.

A green clay object having a composition embodying the present invention behaves as a conventional plastic clay when wet and can be converted to a ceramic object by heating to maturity, and for a given composition the maturity temperature typically has a range of at least about 350° F. Accordingly, the green clay object can be converted to a ceramic object by heating for an appropriate time to a temperature within the composition's maturity temperature range.

The COE of a ceramic object made by firing a green clay object embodying the invention depends on the particular temperature in the maturity temperature range to which the green clay object was heated. Accordingly, a given clay embodying the invention may be used to produce ceramic materials that are compatible with several glasses, having different COEs, depending on the temperature to which the clay is fired. Compositions embodying the invention have been have been formulated such that a ceramic object made by firing the green clay object are compatible with glasses having a COE between 75 and 110, permitting the clay object to be fused to a selected glass, e.g. by kiln forming or by working and applying hot glass outside a kiln. In general, to achieve compatibility, the COE of the ceramic should be within +/−5 of the COE of the glass. For example, a ceramic having a COE of 90 would be considered compatible with a glass having a COE in the range from 85 to 95.

A green clay body having a composition embodying the invention may be bisque fired to drive off water and organic volatile compounds to create a hard object without undergoing the irreversible change to a ceramic object. The bisque object may subsequently be heated to maturity to form a ceramic object.

It is desirable to select the ingredients of the composition so that they do not give off excessive gas during firing, such as might create bubbles in the glass or between the fired clay and the glass.

A clay body having a composition embodying the invention can be designed using commercially available clays and frits (powdered glass) without requiring that clays from particular mines be used.

A clay composition embodying the present invention may include clays from one or more sources. The clay composition may also include a glass frit. The glass frit may supply a substantial part of the silicon and it may also supply other elements, such as boron. The glass frit may account for more than 50 wt % of the clay composition. The particle size of the glass frit may be in the range from about 80–400 mesh and is preferably in the range from about 100–200 mesh.

In accordance with a first aspect of the invention, a ceramic object made from a clay embodying the invention is compatible with certain glasses having a fusing temperature range that at least partially overlaps the maturity temperature range of the composition. This allows the heating to maturity of the clay and the fusing to a selected glass to take place in a single heating operation. Table IA specifies the proportions (percentages by weight) of a range of embodiments of the invention in its first aspect.

TABLE IA

| | |
|---|---|
| BaO | 0–4.5 |
| CaO | 0–8.25 |
| PbO | 0–8 |
| $Li_2O$ | 0–8.5 |
| MgO | 0–2.5 |
| $K_2O$ | 0–8 |
| $Na_2O$ | 0–8.5 |
| ZnO | 0–1.5 |
| SrO | 0–3.5 |
| $TiO_2$ | 0–1.5 |
| $Al_2O_3$ | 10.5–14.5 |
| $B_2O_3$ | 7–12.5 |
| $SiO_2$ | 50–70 |
| $Fe_2O_3$ | 0–1.5 |
| MnO | 0–2.5 |

In accordance with a second aspect of the invention, a ceramic object made from a clay embodying the invention is compatible with certain glasses having a fusing temperature range that is lower than the maturity temperature range of the composition. In this case, a clay object can be heated to maturity and is then allowed to cool and the resulting ceramic object is brought into contact with and fused to a selected glass. The step of heating the clay object to maturity before the ceramic object is brought into contact with the glass for fusing is referred to herein as pre-firing. Table IB specifies the proportions (percentages by weight) of a range of embodiments of the invention in its second aspect.

TABLE IB

| | |
|---|---|
| BaO | 0–4.5 |
| CaO | 0–8.25 |
| PbO | 0–8 |
| $Li_2O$ | 0–8.5 |
| MgO | 0–2.5 |
| $K_2O$ | 0–8 |
| $Na_2O$ | 0–8.5 |
| ZnO | 0–1.5 |
| SrO | 0–3.5 |
| $TiO_2$ | 0–1.5 |
| $Al_2O_3$ | 10.5–14.5 |
| $B_2O_3$ | 0–8.5 |
| $SiO_2$ | 60–85 |
| $Fe_2O_3$ | 0–1.5 |
| MnO | 0–2.5 |

A clay composition embodying the invention can be used in several forms. When the clay composition is in the green state and contains less than about 21% by weight water, it behaves as a powder or partially saturated dry material and can be sifted, combed, blown, pressed, layered, rolled, crumbled, carved, sawn or tooled. The clay can be placed on top of or underneath a glass object or between two glass objects.

In the event that the clay composition contains between about 22% and about 35% by weight water, it behaves much as a conventional plastic clay and is a soft, pliant, impressionable material without grain or direction. The clay can be modeled, pounded, flattened, rolled, pinched, coiled, pressed, thrown on a potter's wheel, cast or pressed into molds, scored, shredded, pierced, stamped, extruded, cut or spun. As in the case of the dry material, the plastic material can be applied on top of or beneath a glass object or between two glass objects, for example.

In the event that the clay composition contains more than about 36% by weight water, it behaves as a slurry and can be poured, injected, dropped, spread, combed, brushed, sprayed, splattered, printed or screened onto a surface of a glass object. For a given proportion of water, the viscosity of the slurry can be adjusted by addition of gums, binders and deflocculants.

A clay composition embodying the present invention in its first aspect, whether in the powder, plastic or slurry form, can be used to make a clay object and the clay object can be placed on top of or beneath a glass object, or between two glass objects, and the combination of the clay object and the glass object(s) can be fired to form a composite structure.

A clay composition embodying the present invention in its second aspect, whether in the powder, plastic or slurry form, can be used to make a clay object and the clay object can be fired to maturity The pre-fired object can be placed on top of or beneath a glass object, or between two glass objects, and the combination of the pre-fired object and the glass object(s) can be fused to form a composite structure.

A clay object made in one or more of the forms mentioned above can be applied to or combined with a glass object in numerous ways. For example, the clay object may be placed on a kiln shelf, on refractory paper or on thin fire paper. Alternatively, the clay object can be placed in or on a mold. In either case, the clay object may be fired with a glass so that the glass will fuse on top of the clay object. The clay may be wet or left to dry before the firing takes place. The mold may be constituted by or include a ceramic board, ceramic fiber sheets or cloth, a kiln shelf coated with refractory resist, a plaster mold, a carbon block, a refractory castable material (such as steel, stainless steel, zirconium or plaster), ceramic resist paper, or a combination thereof. It will be appreciated by those skilled in the art that it may be necessary to use a refractory resist on the surface of a ceramic shelf or board or any other object that the glass may contact.

A layer of clay in one or more of the forms described above may be applied directly to the surface of a sheet of transfer paper or cloth that has been precut to a desired shape and which may be textured or smooth. The sheet of transfer paper or cloth is then used to support the layer of clay material when it is applied to a glass object and the glass object with the layer of clay material applied thereto is fired. The transfer material burns away in the firing process and leaves the layer of clay in the desired shape in contact with and fused to the glass object.

In the event that the transfer material is textured, the reverse of the texture is imparted to the layer of clay material and is preserved by the firing. FIG. 5 shows composite structures made using the surface application processes with clay in dry or slurry form. FIG. 5A shows a mechanically printed design of clay on transfer paper, which can be placed on top of a glass object. FIG. 5B shows a cut out design in transfer paper which was covered by the clay in slurry form and placed on top of a glass object.

Inclusions of glass can be mixed partially or wholly within, or layered partially or wholly within, or inserted partially or wholly into, a clay object formed by one of more of the methods described above and the resulting composite object fired to fuse the clay material and the glass inclusions. The sizes of the glass inclusions can range from a small grain size (200 mesh or smaller) to large chunks, blocks or sheets. The composite object (clay object with glass inclusions) may be fired by itself or in contact with one or more glass objects, or in contact with one or more clay objects embodying the present invention. The composite object may contain more or less clay than the selected glass. Frits or enamels may be applied to the composite object, for example as described below with reference to FIGS. 9A–9C.

A clay embodying the invention, when applied to the bottom and side surfaces of a glass tile and fused, can be used to provide a textural surface for the purpose of forming an enhanced mechanical bond between the glass of the tile and mortars, grouts and glues, such as epoxies. The clay may be applied to the glass tile in one of the methods described above, or a combination of those methods. Referring to FIG. 7, the clay may be applied to the underside of the glass in slurry form by brushing, printing or spraying onto the glass tile (FIG. 7A), as a thick combed layer in plastic form (FIG. 7B), or as a medium thickness textured layer (FIG. 7C). By heating to maturity, the clay is converted to ceramic and the two layers fuse together. The clay layer may range in thickness from a rather thin film to a thickness comparable to a ceramic tile or even thicker.

For added plasticity of the green clay, a desirable source of aluminum in the composition is macaloid benonite in the range 1–3 wt %. If additional plasticity is not desired, another source of aluminum may be used.

Gums, binders or adhesives can be added to the clay composition to adjust the plasticity of the clay in the green state. These additives burn off during firing of the clay. In the case of the first aspect of the invention, the additives may assist in temporarily binding the composition to the glass.

In the plastic form, the clay can be preformed or shaped with interior or exterior threads, holes or fixtures. When the clay object has been fired, the threads, holes or fixtures can be used to temporarily attach an implement, such as a handle (FIG. 22), rod or lever to the clay object. The implement with the attached pre-fired clay object can then be used as a tool for gathering or picking up and hot working molten or semi-molten glass. A pre-fired clay object may-be picked up with a hot punty or hot blow pipe provided with a tip of sticky glass (FIGS. 23 and 24), and the clay object may be used to gather, wrap, add or pull additional glass. The pre-fired clay object with gatherfused glass may be placed in a kiln or annealer for cooling or future working, or placed in a glory hole for exterior heating and continued hot working. Beads made of a clay embodying the invention may be wrapped with molten glass in a similar fashion but on a smaller scale. FIGS. 25 and 26 each show a glass bubble on the end of a blow pipe. In the case of FIG. 25, discrete clay objects embodying the invention, such as beads, are embedded in the glass and in the case of FIG. 26 the clay objects adhere to the exterior of the bubble. Compatible molten glass can be dropped onto, poured onto, pushed onto or wrapped around the pre-fired clay object. The temperature of hot working must not exceed the clay's maturity temperature range. A clay object that has been pre-fired to a higher maturity temperature than the hot working range of a particular glass can be used for hot working and its compatibility is not affected by the hot working. FIG. 8 shows composite structures in which the ceramic object has been formed from a clay object in the plastic form. FIG. 8A shows holes or cavities extending upward into the interior of the ceramic object for fixturing. FIG. 8A also shows tabs extending horizontally beyond the glass object. FIG. 8B shows internally threaded holes extending upward into the interior of the ceramic object. FIG. 8C shows a ceramic object having externally threaded protrusions and a foot pierced with a hole.

The clay object can be heated to the fusion temperature of the compatible glass inside a kiln or it can be heated and worked with hot glass outside the kiln. In the latter case, the clay object must be returned to the kiln for proper annealing and cooling.

Traditional methods of hot working glass can be used in conjunction with the pre-fired clay object. Such methods include, but are not limited to, gathering, wrapping, roll-up, dripping, pulling, pushing, picking up, spinning, pressing, molding, flaring, stamping, blowing, marvering, reaming, shaping, poking, paddling, raking, mashing, puffing and fuming. These traditional hot working methods can be used in combination with the fixturing methods described above for forming the compatible glass and the pre-fired ceramic composition.

The clay composition and compatible glass can be formed to create beads, knobs and pulls, bowls, plates, planters, cups, vases, tiles, lamps and lamp shades, sinks and basins, paperweights, ornaments, figurines, teapots and pictures, abstractions, marbles, bracelets, canes and jewelry, among others.

The clay composition can be used with a compatible glass to make a murrini. Objects made of the clay composition are rolled up inside a molten body of compatible glass using the hot working processes described above, or fused into place in a kiln. Alternatively, pieces of compatible glass may be encased or wrapped in the clay composition and the resulting article fused to form the murrini. In another case, the murrini can be cut and placed for fusing with a clay object and/or a glass object. The murrini can also be cut and hot worked. Frits and enamels may be applied within or on the surface of the murrini. The clay composition may be dry, plastic, slurry or pre-fired. See FIG. 6.

The processes and method described above may require use of various tools that are used in the glass working and ceramic arts.

A colored compatible frit or enamel may be applied directly to the surface of the clay object embodying the invention, whether in the wet, dry or pre-fired state. The frit or enamel may be applied by any one or more of numerous suitable techniques, such as spraying, printing and screening.

Gums, binders or other additives may be added to the frits and enamels to assist in binding them to the clay object. The additives burn off during firing.

Gums, binders or additives may also be applied directly to the surface of the clay object to aid in the binding of dry compatible frits and enamels to the surface of the clay object. In this case also the additives burn off during firing. Various techniques can be used in connection with application of frits and enamels to the clay article, including the techniques known as sgraffito and mishima. FIG. 9A shows a ceramic object serving as a base material. The clay object was covered with a colored compatible frit or enamel which was scratched through to expose the clay object. A layer of glass is fused to the frit or enamel and the exposed ceramic. FIG. 9B shows a ceramic object derived from a clay object with a textured upper surface, the texture having been filled in with compatible colored frits or enamels and the composite object fired face up. FIG. 9C shows a similar structure to FIG. 9B with a layer of compatible glass fused over the upper surface.

The methods described above, including methods involving fixturing of the hot working glass, hot working techniques, forms and murrini can be employed or applied to a clay article and a colored compatible frit or a combination of compatible frits.

The clay object, once in its desired shape or textural form, is placed relative to the glass at the artistic discretion and/or for the desired application or effect. Referring to the drawings, the clay object may be placed on top of a piece of glass, beneath a piece of glass, between two pieces of glass, for example. The clay object may be in the plastic state or dry, at the artistic discretion and/or for the desired application or effect. For example, the artist may choose that the clay object be in the plastic state and placed beneath a piece of compatible glass, in which case the clay object may be distorted by the weight of the compatible glass.

Conversely, the glass may be placed relative to the clay object in numerous spatial relationships. The glass in the solid or hard state, when cool, may be stacked, layered, leaned, stilted, piled relative to the clay object, poured from a containment pot onto the clay object within the kiln during firing, or placed hot into or onto the clay object during firing. The placement of glass relative to the clay object can be accomplished by one or more of these placements. The glass that is placed in contact with the clay object may be in the form of particles, chunks, shapes, blocks, sheets, stringers, and confetti. Size of the glass is limited by the kiln size.

To illustrate possible placement techniques, FIG. 10 shows glass pieces leaning against a clay object for fusing thereto; FIG. 11 shows a clay object used as a drop out mold and a layer of glass fused to the clay object, the glass having slumped during the firing process; and FIG. 12 shows several clay objects placed between and fused to layers of glass.

If the glass is in the form of one or more layers or a slab, a hole may be cut in the glass and the clay object placed in the hole. Referring to FIGS. 13, 14 and 15, the clay object may be used to provide an interior or exterior dam holding back flow of glass or to provide a void through or within the glass.

The clay object can be fused with a glass piece and the composite structure worked in some fashion and placed with another clay object or with more glass, and re-fired and fused.

Referring to FIGS. 16A and 16B, the clay object can be formed or shaped prior to firing with threads, holes, tabs, or small fixtures. FIG. 16A illustrates a composite structure in which the ceramic object serves as a base for a glass object. The ceramic object is formed with two cylindrical holes within it. One hole contains a screw that is held in the hole by adhesive. A sleeve is held in the other hole by adhesive; a screw is threaded into the sleeve. A drawer pull can be fashioned in similar manner, as shown in FIG. 27. FIG. 16B illustrates a composite structure in which the ceramic object serves as a base for a glass object. The ceramic object is formed with two holes having textured interior surfaces formed when the clay was in the plastic state. After fusing to a glass object, the holes can be used to provide fixturing of pins, posts, bolts or other fastening elements for attaching the composite structure to another structure. The attachment features can be formed into or extend out of the clay object and can be used as a textural surface for improved adhesion to form a stronger mechanical bond with the glass object than might otherwise be readily achieved. As mentioned above, a layer of the clay composition may be applied to a surface of the glass object and used as a textural surface for the purpose of added adhesion to form a stronger mechanical bond, for example in the case of glass tile.

Commercially available ceramic stains and oxides may be added to the clay in suitable amounts (up to 10 wt %) for coloring. Addition of coloring agents may alter significantly the COE of the ceramic object. Coloring agents that are currently commercially available include compounds of iron, vanadium, cobalt, copper and nickel.

EXAMPLE I

The following procedure (steps A–I) for firing and cooling clay embodying the invention in its first aspect has been found to be acceptable:

A. The kiln shelf should be prepared in conventional manner to prevent the glass or clay sticking to the shelf during firing.

B. The standard firing schedule should be used for the selected glass. The thickness of the thickest piece of glass should be used to determine the appropriate schedule.

C. In the event that the thickness of the clay object is 3 mm or less, the heating rate up to about 400° F. should not exceed 300° F. per hour in order to allow moisture to evaporate or dissipate from the clay object. In the event that the thickness of the clay object is 3 mm or more, the clay object should be bone dry before exceeding a temperature of about 150° F. and preferably the clay object should be completely dry before placing in the kiln. Once the clay object is completely dry, heating to 400° F. can proceed at a rate of 80–100° F. per hour.

D. After the preheat described in paragraph C, the kiln should then be heated from 400° F. to the desired fusing temperature at a rate of 80° F. per hour to about 570° F. per hour, but within the firing schedule for the particular glass and the thickness of the glass.

E. The selected maturity temperature is a function of time, the maturity temperature range, and mass. The longer the clay is held at the selected maturity temperature, the more vitreous the clay becomes, thus changing its viscosity and COE. The maturity temperature range of the compositions defined in Table IA is 1500+/−300° F. Preferably, the clay is held at the selected maturity temperature for a soak time of 10 minutes, but a soak time of up to 24 hours is possible, depending on the maturity temperature that is selected.

F. Soaking at the selected maturity temperature helps to ensure that the kiln and its contents reach a uniform temperature. It is good practice to record the soak time and selected maturity temperature.

G. To avoid devitrification of the glass, it is necessary to cool the glass rapidly from its fusing temperature to a temperature below its devitrification temperature but not below its annealing temperature. Standard annealing schedules should be used for the selected glass and the thickness of the glass.

H. It is important to cool the fused composite structure from the annealing temperature to about 200° F. sufficiently slowly to avoid causing stress in the glass and/or ceramic. In the event that the maximum thickness of the composite structure is 0.5 inch or less, the cool down rate should be no more than 150° F. per hour, and in the event that the maximum thickness is more than 0.5 inch the cool down rate generally should not exceed 25° F. per hour. The rate of cooling to 200° F. should not exceed the recommended cooling rate for the thickest piece of glass in the composite structure.

I. Cooling from 200° F. to ambient temperature should normally take place at the natural cooling rate of the kiln, although it might be necessary to use a lower cooling rate if the composite structure includes a thick piece of glass.

EXAMPLE II

Before pre-firing a clay object embodying the invention in its second aspect, the clay object should be fully dried before exceeding a temperature of about 150° F. and preferably the clay object should be bone dry before placing in the kiln. Once the clay object is completely dry, heating to 400° F. can proceed at a rate of 80–100° F. per hour. The kiln should then be heated from 400° F. to the desired maturity temperature at a rate of 80° F. per hour to about 570° F. per hour, with a soak at the maturity temperature as described above in steps D, E and F of Example I. The maturity temperature range of the compositions defined in Table IB is about 100° F. For example, the maturity temperature range of composition E is about 1780+/−50° F. with the best fit for a glass having a COE of 90 in the event that the clay object is fired at 1780° F. For other firing temperatures within the range, and depending on the soak time at the selected firing temperature, a glass having a COE of 90 may fit but greater stresses will be induced as the difference between the firing temperature and the center maturity temperature (1780° F.) increases. The pre-fired ceramic object can be allowed to cool at the natural rate of the kiln.

For fusing the pre-fired ceramic object and a glass object, the pre-fired ceramic object and the glass object may be heated to the fusing temperature in the same kiln. Since the ceramic object can be heated more rapidly than glass without developing undue stress, it is desirable to follow the standard heating schedule for the selected glass.

A composite structure including a pre-fired ceramic object may be re-heated to the fusion temperature of the glass, for example for fusing with additional glass or for hot working. For re-heating the composite structure to the fusing temperature of the selected glass it is preferable to use the reverse of the standard cooling rate schedule for the glass as a guide if the schedule requires a temperature change of 25° F. or less per hour. Alternatively, the heating schedule may be the reverse of the slowest cooling schedule used for any of the components of the composite structure. The process in general follows steps G, H and I of Example I.

Table II defines five different compositions embodying the invention, in parts by weight on the oxide basis. It will be noted that the proportions shown in a given column of Table II do not sum to 100 and accordingly Table II does not define the compositions in percentages by weight.

TABLE II

|     | A    | B    | C    | D   | E   |
| --- | ---- | ---- | ---- | --- | --- |
| CaO | 1.68 | 5.85 | 1.31 | .93 | .68 |
| MgO | .25  | .26  | .27  | .52 | .40 |

TABLE II-continued

|      | A     | B     | C     | D     | E     |
|------|-------|-------|-------|-------|-------|
| K$_2$O    | 6.34  | 4.00  | 6.39  | 5.18  | 5.95  |
| Na$_2$O   | 7.40  | 6.51  | 7.09  | 1.80  | 4.27  |
| ZnO  | .56   | .24   | .55   | .09   | .33   |
| TiO$_2$   | .04   | .04   | .04   | .09   | .07   |
| Al$_2$O$_3$  | 12.71 | 12.67 | 13.01 | 12.81 | 13.18 |
| B$_2$O$_3$   | 10.04 | 10.00 | 9.37  | 1.37  | 5.07  |
| SiO$_2$   | 58.71 | 57.58 | 59.59 | 74.00 | 67.12 |
| Fe$_2$O$_3$  | .30   | .35   | .33   | .45   | .45   |

It will be appreciated that compositions A, B and C are in accordance with Table IA and that compositions D and E are in accordance with Table IB. BaO, PbO, SrO and MnO may be used as partial or complete substitutes for CaO, MgO and ZnO, and Li$_2$O may be used as a partial or complete substitute for K$_2$o or Na$_2$O. Cryolite (sodium fluoraluminate Na$_3$AlF$_6$), which is a common ingredient of glass compositions and acts as a strong flux, may also be included. The preferred oxides, which are indicated in Table II, are selected for availability and to avoid difficulties in handling and possible toxicity.

Referring now to the compositions defined in Table II, composition A is fired at a temperature in the range 1350° F. to 1525° F. and is compatible with a glass having a COE of 90; composition B is fired at a temperature in the range from 1350° F. to 1650° F. and is compatible with a glass having a COE of 85; and composition C is fired at a temperature in the range from 1350° F. to 1600° F. and is compatible with a glass having a COE in the range 90–96. Experiments with compositions D and E have involved pre-firing the clay to a higher temperature and subsequently fusing the clay to a glass at a lower temperature. In a first experiment with composition D, the clay was pre-fired to a temperature in the range 2100° F. to 2275° F. and was compatible with a glass having a COE of 80–90 when fused at a temperature in the range from 1350° F. to 2250° F.; in a second experiment the clay was pre-fired to a temperature in the range of 2100° to 2175° and was compatible with a glass having a COE of 90–96 at a temperature in the range 1350° F. to 2150° F.; and in a third experiment the clay was pre-fired to a temperature in the range of 2150° F. to 2199° F. and was compatible with a glass having a COE of 90–96 at a temperature in the range 1359° F. to 2150° F. In a first experiment with composition E, the clay was pre-fired to a temperature in the range 1720° F. to 1850° F. and was compatible with a glass having a COE of 85–90 when fused at a temperature in the range from 1350° F. to 1800° F.; in a second experiment the clay was pre-fired to a temperature in the range of 1700° F. to 1775° F. and was compatible with a glass having a COE of 90–96 at a temperature in the range 1350° F. to 1725° F.; and in a third experiment the clay was pre-fired to a temperature in the range of 1650° F. to 1750° F. and was compatible with a glass having a COE of 96–100 at a temperature in the range 1350° F. to 1700° F.

FIGS. 1A, 1B and 1C show, respectively, composite structures including ceramic objects located beneath a glass object, above a glass object, and between two glass objects. The ceramic objects are, in each case, fused to the glass object. The ceramic objects may be made from clay in dry, plastic, slurry or pre-fired form. The surface application technique may be used also.

FIG. 2 shows composite structures including ceramic objects located beneath a glass object, above a glass object, and both beneath and above a glass object. The ceramic objects may be made from clay in slurry form.

FIG. 3 shows composite structures including ceramic objects located beneath a glass object, between two glass objects, and beneath, above and between glass objects. The ceramic objects may be made from clay in dry or pre-fired form. The surface application may be used.

FIG. 4 shows composite structures including ceramic objects fused to a compatible glass object. FIG. 4 shows how the clay objects may be placed on kiln shelf, on refractory felt or on thin fire paper, as described above. FIG. 4 also shows that one clay object may be placed on top of another clay object. In the case of FIG. 4A, the clay object is placed on top of a resist prepared shelf, in FIG. 4B the clay objects are placed on refractory felt, without use of resist (slurry or dry). In FIG. 4C the clay objects (dry or slurry) are placed as a texture on thin fire paper without resists.

The important functional distinction between the compositions of Table IA and the compositions of Table IB is that the range of maturity temperatures for the compositions of Table IB is substantially higher than that for the compositions of Table IA, and it is this difference that gives rise to the different techniques for fusing the selected glasses to the ceramic objects. However, a glass having a fusing temperature range that is suitably related to the maturity temperature range of a composition of Table IB could be fused to a ceramic object derived from that composition concurrently with the firing of the clay object, i.e. without pre-firing. Correspondingly, a clay object having a composition in accordance with Table IA may be pre-fired and subsequently fused with a glass of which the fusing temperature range is below the maturity temperature range of the clay composition.

It will be appreciated that the invention is not restricted to the particular embodiment that has been described, and that variations may be made therein without departing from the scope of the invention as defined in the appended claims and equivalents thereof. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated.

What is claimed is:

1. A composite structure comprising a ceramic object and a glass object fused together, the ceramic object consisting essentially of, in parts by weight on oxide basis:

| | |
|---|---|
| Al$_2$O$_3$ | 10–15% |
| SiO$_2$ | 50–85% |
| B$_2$O$_3$ | 0–12.5% | and 10–20% metal oxides of the form RO or R$_2$O.

2. A composite structure according to claim 1, wherein said metal oxides include BaO, CaO, PbO, Li$_2$O, MgO, K$_2$O, Na$_2$O, ZnO, SrO; or MnO.

3. A composite structure according to claim 2, wherein the ceramic object includes up to 4.5% BaO, up to 8.25% CaO, up to 8% PbO, up to 8.5% Li$_2$O, up to 2.5% MgO, up to 8% K$_2$o, up to 8.5% Na$_2$O, up to 1.5% ZnO, up to 3.5% SrO and up to 2.5% MnO, by weight on oxide basis.

4. A composite structure according to claim 1, wherein the ceramic object comprises up to 1.5% TiO$_2$, up to 1.5% Fe$_2$O$_3$ and up to 1.5% P$_2$O$_5$.

5. A composite structure according to claim 1, wherein the ceramic object comprises 50–70% SiO$_2$ and 7–12.5% B$_2$O$_3$.

6. A composite structure according to claim 1, wherein the ceramic object comprises 60–85% $SiO_2$ and 0–8% $B_2O_3$.

7. A composite structure according to claim 1, wherein the ceramic object comprises about 13 parts by weight $Al_2O_3$, from about 57 to about 60 parts by weight $SiO_2$, at least about 9 parts by weight $B_2O_3$, and from about 10 to about 14 parts by weight alkali metal oxides.

8. A composite structure according to claim 1, wherein the ceramic object comprises about 13 parts by weight $Al_2O_3$, from about 57 to about 60 parts by weight $SiO_2$, at least about 9 parts by weight $B_2O_3$, from about 10 to about 14 parts by weight alkali metal oxides, and from about 1 to about 6 parts by weight CaO.

9. A composite structure according to claim 1, wherein the ceramic object comprises at least about 12 parts by weight $Al_2O_3$, from about 65 to about 75 parts by weight $SiO_2$, from about 1 to about 5 parts by weight $B_2O_3$, and from about 7 to about 10 parts by weight alkali metal oxides.

10. A composite structure according to claim 1, wherein the ceramic object comprises at least about 12 parts by weight $Al_2O_3$, from about 65 to about 75 parts by weight $SiO_2$, from about 1 to about 5 parts by weight $B_2O_3$, from about 7 to about 10 parts by weight alkali metal oxides, and less than about 0.9 parts by weight CaO.

\* \* \* \* \*